(12) United States Patent
Resnick

(10) Patent No.: US 7,822,911 B2
(45) Date of Patent: *Oct. 26, 2010

(54) MEMORY DEVICE AND METHOD WITH ON-BOARD CACHE SYSTEM FOR FACILITATING INTERFACE WITH MULTIPLE PROCESSORS, AND COMPUTER SYSTEM USING SAME

(75) Inventor: David Resnick, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 463 days.

This patent is subject to a terminal disclaimer.

(21) Appl. No.: 11/893,604

(22) Filed: Aug. 15, 2007

(65) Prior Publication Data

US 2009/0049245 A1  Feb. 19, 2009

(51) Int. Cl.
 *G06F 12/00* (2006.01)
(52) U.S. Cl. .......................... 711/5; 711/104; 711/105; 711/118
(58) Field of Classification Search .................. 711/5, 711/104, 105, 118
 See application file for complete search history.

(56) References Cited

U.S. PATENT DOCUMENTS

| 4,796,232 | A | 1/1989 | House | 365/189 |
|---|---|---|---|---|
| 4,975,878 | A | 12/1990 | Boddu et al. | 365/189.07 |
| 5,067,071 | A | 11/1991 | Schanin et al. | 395/275 |
| 5,163,139 | A | 11/1992 | Haigh et al. | 395/375 |
| 5,488,583 | A | 1/1996 | Ong et al. | 365/201 |
| 5,737,757 | A | 4/1998 | Hassoun et al. | 711/145 |
| 5,802,541 | A | 9/1998 | Reed | 711/1 |
| 6,049,487 | A | 4/2000 | Plants et al. | 365/189.04 |
| 6,081,876 | A | 6/2000 | Brewer et al. | 711/163 |
| 6,321,314 | B1 | 11/2001 | Van Dyke | 711/163 |
| 6,378,049 | B1 | 4/2002 | Stracovsky et al. | 711/147 |
| 2003/0018860 | A1 | 1/2003 | Krueger | 711/152 |
| 2005/0097276 | A1* | 5/2005 | Lu et al. | 711/118 |
| 2005/0207257 | A1* | 9/2005 | Skidmore | 365/230.01 |
| 2006/0190671 | A1* | 8/2006 | Jeddeloh | 711/5 |
| 2009/0049250 | A1 | 2/2009 | Resnick | 711/147 |
| 2009/0049264 | A1 | 2/2009 | Resnick | 711/163 |

FOREIGN PATENT DOCUMENTS

EP  0718769  6/1996

\* cited by examiner

*Primary Examiner*—Mardochee Chery
(74) *Attorney, Agent, or Firm*—Dorsey & Whitney LLP

(57) ABSTRACT

A memory device includes an on-board cache system that facilitates the ability of the memory device to interface with a plurality of processors operating in a parallel processing manner. The cache system operates in a manner that can be transparent to a memory controller to which the memory device is connected. Alternatively, the memory controller can control the operation of the cache system.

27 Claims, 3 Drawing Sheets

MEMORY DEVICE AND METHOD WITH ON-BOARD CACHE SYSTEM FOR FACILITATING INTERFACE WITH MULTIPLE PROCESSORS, AND COMPUTER SYSTEM USING SAME

TECHNICAL FIELD

This invention relates generally to memory devices, and, more particularly, to a memory device and method that facilitates access by multiple memory access devices, as well as memory systems and computer systems using the memory devices.

BACKGROUND

As computer and computer system architecture continues to evolve, the number of processing cores and threads within cores is increasing geometrically. This geometric increase is expected to continue, even for simple, relatively inexpensive computer system. For server systems, system sizes measured in the number of processors are increasing at an even faster rate.

Although this rapid increase in the number of cores and threads enhances the performance of computer systems, it also has the effect of making it difficult to apply the increasing parallelism to single applications. This limitation exists even for high-end processing tasks that naturally lend themselves to parallel processing, such as, for example, weather prediction. One of the major reasons for this limitation is that the number of communication paths between processors, cores, and threads increases disproportionately to the number of times the task is divided into smaller and smaller pieces. Conceptually, this problem can be analogized to the size of a processing being represented by the volume of a 3D cube. Each time this volume is divided into smaller cubes, the total surface area of the cubes, which represents data that must be communicated between the processors working on sub-cubes, increases. Every time that the number of processors goes up by a factor of eight the total amount of information to be communicated between the greater number of processors doubles.

One reason for these problems caused by increasing parallelism is that most systems communicate by sending messages between processors, rather than sharing memory. This approach results in high latencies and high software overheads, although it may simplify some complex system architecture, operating system, and compiler issues. Unfortunately, as the level of parallelism increases, the processors in the system reach the point where all they are doing is managing message traffic rather than actually doing useful work.

There is therefore a need for a system and method that can reduce software overhead and eliminate or at least reduce performance bottlenecks thereby improving system performance and architectural scalability at relatively low cost.

DETAILED DESCRIPTION

Figure 1:
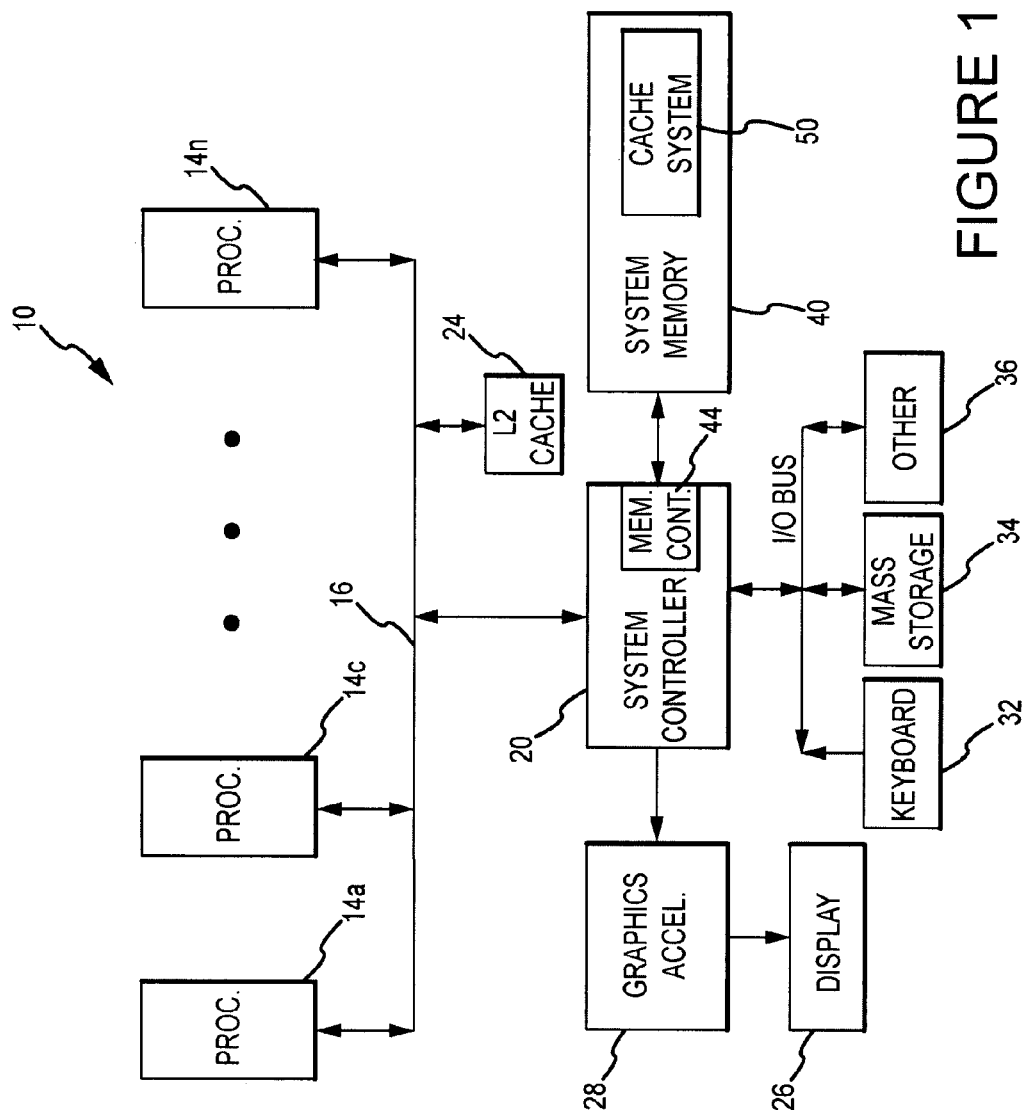
FIG. 1 is a block diagram of a computer system according to one embodiment.

A computer system 10 according to one embodiment is shown in FIG. 1. The computer system 10 includes several parallel processors $14_{1-N}$ connected to a common processor bus 16. Also connected to the processor bus 16 are a system controller 20 and a level 2 ("L2") cache 24. As is well known in the art, each of the processors $14_{1-N}$ may include a level 1 ("L1") cache.

The system controller 20 drives a display 26 through a graphics accelerator 28, which may include a graphics processor and graphics memory of conventional design. Also connected to the system controller 20 is an input/output ("I/O") bus 30, such as a peripheral component interconnect ("PCI") bus, to which are connected a keyboard 32, a mass storage device 34, such as a hard disk drive, and other peripheral devices 36.

The computer system 10 also includes system memory 40, which may be a dynamic random access memory ("DRAM") device. The system memory 40 is controlled by memory controller circuitry 44 in the system controller 20 through a memory bus 46, which normally includes a command/status bus, an address bus and a data bus. However, the system memory 40 departs from conventional systems by including in the system memory 40 an on-board cache system 50 that enhancers the ability of the parallel processors $14_{1-N}$ to access the system memory 40 in an efficient, low latency manner. It should also be understood that the cache system 50 may be used in the system memory 40 or other memory devices in a computer or other processor-based systems that differ from the computer system 10 shown in FIG. 1. For example, servers and other high-end systems will generally not include the graphics accelerator 28, the display 26, the keyboard 32, etc., but will have disk systems or simply connect to a network of other similar processors with attached memory.

The use of a cache system in the system memory 40 may provide several advantages, particularly as the demands on memory devices increases with increasing parallelism. The cache system can significantly reduce the amount of hardware required for the parallel processors $14_{1-N}$ to communicate with other and/or access the system memory 40, and it can reduce processor and network complexity in high-end systems. Although placing a cache function within the system memory 40 does not provide cache bandwidth the same as in the typical case in which a cache, like the L2 cache 24, is implemented on or in communication with the processors $14_{1-N}$, it does provide for sharing data between the processors $14_{1-N}$ as well as between threads being executed by the processors $14_{1-N}$ without resulting in bank timing and other issues that lower sustained memory bandwidth. Additionally, unlike caches in or associated with processors, a cache system in the system memory 50 avoids the need for a cache system for each of a large numbers of processors, cores, and threads, thereby minimizing die size and interconnect and pin issues. Also, depending on the system and network architectures, data coherency design can be greatly simplified by sharing data through memory-level caching. In most systems, the cache system would functions as a Level 3 ("L3") cache since the system 10 will generally include L1 cache in the parallel processors $14_{1-N}$ in addition to the L2 cache 24. A cache system in the system memory 40 can also reduce read latency for memory requests and improve performance because data that is found in the cache system avoids DRAM memory cycles, $t_{FAW}$ limits, etc. Additionally, many applications may benefit by increased memory buffering compared to the capacity of page/row buffers in each memory bank. The cache system can also provide improved communication processes, also possibly improving sustained system performance without changing peak bandwidths that may result in increased costs of higher pin counts, etc. The cache system or a cache system according to some other embodiment can be implemented in the system memory 40 while keeping the internal organization of the memory system substantially the same as in conventional system memories. For example, bank timing and memory data rates can be substantially the same. Further, the cache system need not be particularly fast as the operations needed are generally simple and fit with current and anticipated memory clock rates.

Figure 2:
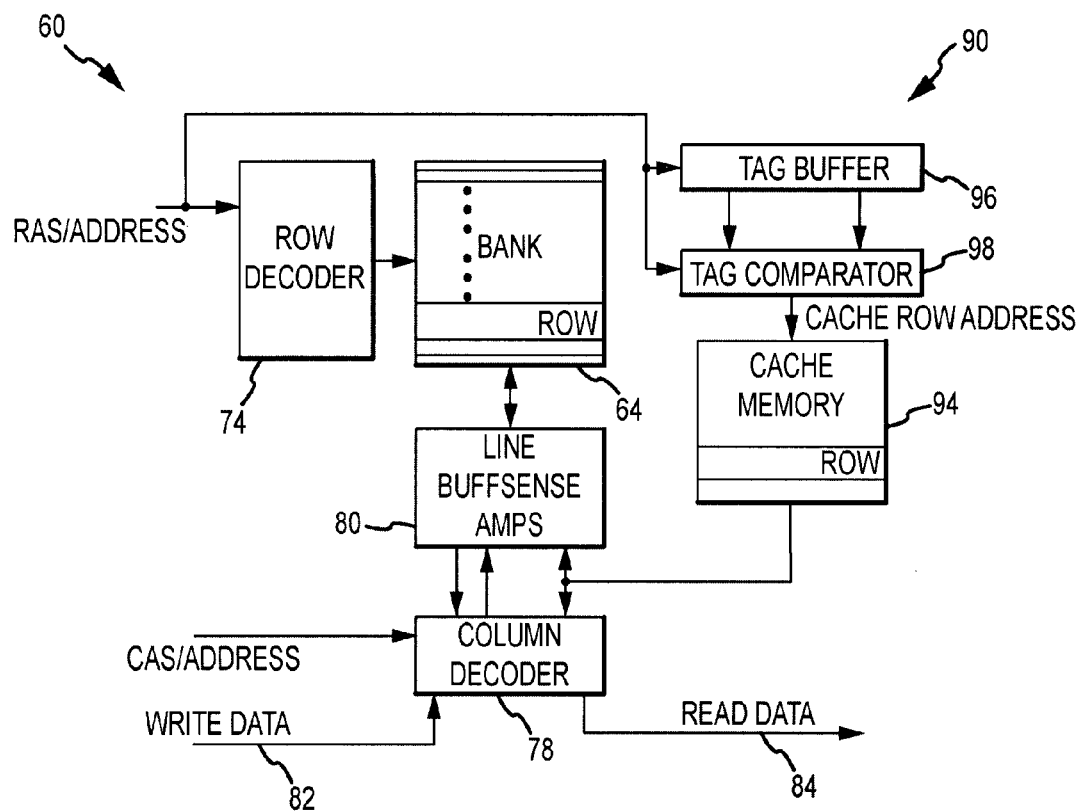
FIG. 2 is block diagram of a system memory device according to one embodiment that may be used in the computer system of FIG. 1.

A portion of a system memory device according to one embodiment is shown in FIG. 2. In the embodiment shown in FIG. 2, the memory device is a dynamic random access memory ("DRAM") device 60, although other types of memory devices can be used. The DRAM 60 includes at least one Bank 64 of memory cells arranged in rows and columns. An addressed row of memory cells in the Bank 64 is selected by signals from a row decoder 74, which stores a received row address responsive to a received row address strobe ("RAS") signal. An addressed column of memory cells in the Bank 64 is selected by signals from a column decoder 78, which stores a received column address responsive to a received column address strobe ("CAS") signal. Line Buffers and Sense Amplifiers 80 associated with respective columns route write data received through a write data path 82 to the Bank 64, and they route read data from the Bank 64 through a read data path 84.

The DRAM device 60 also includes a Cache System 90, which includes a Cache Memory 94 that is associated with the Bank 64, which also includes memory cells arranged in rows and columns. If a DRAM device 60 includes multiple banks 64, a Cache System 90 may be associated with each Bank 64. The Cache Memory 94 may have a capacity that is large enough to store several pages or lines of the Bank 64. The Cache System 90 also includes a Tag Buffer 96 and a Tag Comparator 98.

The Cache Memory 94 will normally store a changing subset of what is in the Bank 64. Also, data stored at a specific memory line/address can generally reside in multiple places in the Cache Memory 94. As a result, when a cache reference is made, there is a lookup/translation made to convert the requested memory address to a specific location in the cache. The translation is normally done by storing in the Tag Comparator 98 the address of each line as it is stored in the Cache Memory 94. The Tag Buffer 96 uses a portion of the corresponding address of the Bank 64 to access another portion of the referenced address, which is known as a Tag Address. The Tag Address stored in the Tag Buffer 96 is applied to the Tag Comparator 98, which determines if the Tag Address matches corresponding bits in the referenced address. In the event of a match, which is known as a tag "hit," the Tag Comparator 98 outputs the Tag Address as a Cache Row Address to select the row of memory cells in the Cache Memory 94 that stores that data. In the event there is no match, which is known as a tag "miss," the Tag Comparator 98 does not output a Cache Row Address to the Cache Memory 94. In response to a miss, data must be fetched from the memory Bank 64 if the reference was a read. For writes, an immediate read reference can be triggered by the write command, and the data from the read is then merged into the cache line with the original command's write data as well as any new data written since. Alternatively, merging command-write and memory-read data can be postponed until the cache line is evicted from the Cache Memory 94.

In interactions with the Memory Bank 64, each row of the Cache Memory 94 is generally treated as a whole entity, just like when executing normal bank references. Similarly, read and write references appear to be normal I/O transfers. The number of lines in each Cache Memory 94 associated with a respective bank is always a power of two. For example, if the Bank 14 uses 2 KByte pages, then 8 cache lines per Bank 64 provide 16 KBytes of cache per Bank 14. If there are 8 Banks 64 in a memory device, then there are 128 KBytes of cache memory in the device. A memory module (not shown) having 16 memory devices would then have 2 MBytes of cache/buffer memory. As a fair portion of memory accesses will result in cache hits, the use of the Cache System 90 in memory devices may reduce cycle-time and limitations resulting from a large number of banks. The interface to the DRAM device 60 used by the memory controller circuitry 44 may be any suitable design, including interfaces designed according to DDR2 and -3 specifications and data rates. The Cache System should not increase power very much over standard DRAMs as standard functions are done and only one line of the cache per memory bank is active at a time, just as if it were a normal memory row-buffer. There generally will be some added power in the Tag Comparator 98, which checks to see if requested data is present in the Cache memory 60 or instead must be retrieved from the Bank 64. This added power could be largely eliminated if the memory controller 44 (FIG. 1) controls some of the operation of the Cache System 90. There can also be some power increase due to leakage effects.

The memory controller 44 may interface with the Cache System 90 using a variety of techniques. For example, the memory controller 44 may send references to the system memory 40 regardless of whether the requested data is stored in the Cache Memory 94 or not. If the requested data is not stored in the Cache Memory 94, it can be written to the Cache Memory 94 for subsequent access. If the requested data is stored in the Cache Memory 94, then it is returned more quickly than if the data had to be fetched from the Bank 64. This is the simplest way to use the Cache System 90 since it functions in the same manner as a conventional L2 cache. As there are timing differences when data is in the cache Memory 94 or in the Bank 64, the memory controller 44 must be designed so that it can accommodate those differences. For example, if requested data is not stored in the Cache Memory 94, the memory controller 44 may have to issue the request a second time after the requested data has been loaded to the cache. The memory controller 44 must therefore be designed with the timing flexibility required to operate in this manner.

The memory controller 44 may also interface with the Cache System 90 using other techniques. For example, the memory controller 44 may be designed to keep a record of what lines of data are stored in the Cache Memory 94 and to fully control the operation of the Cache System 90. In such a case the Cache System 90 functions like an address-variable data buffer. However, the Cache System 90 must be designed so that it supplies the memory controller 44 with signals to provide information about the status of the Cache System 90.

If line of data referenced by a memory command, such as an activate command, is to be loaded into the Cache System 90, then the Cache System 90 can be designed to precharge the Bank 64, so that the Bank 64 is decoupled from operations in the Cache System 90. However, data must remain valid in the Cache System 90, possibly for a very long time such as, for example, when the Bank 64 is placed in a powerdown/Self Refresh mode. During this time, data may still be fetched from the Cache Memory 94. By automatically precharging rows of data in the Bank 64 that are being transferred to the Cache Memory 94, there is no need to write the cache lines back to Bank 64 during or before refresh operations. Alternatively, the Cache System 90 can be designed so that a row in the Bank 64 is being refreshed, the row in the Cache Memory 94 storing the corresponding data can be used to write the data back into the Bank 64. In any case, lines of data that are modified in the Cache Memory 94 must be written to the Bank 64 before they can be replaced by another line.

In another embodiment, the Cache System 90 operates by providing an indication that the referenced line is not to be loaded to the Cache Memory 94, and a normal read or write occurs in the Bank 64. In this case, it would be necessary for the memory controller 44 to provide an explicit precharge to the DRAM device 60, either as a separate command or as an auto-precharge in a read/write/CAS reference. This duplicates current operations for DRAMs.

As mentioned above, refresh logic can be expanded so that when a row in the Bank 14 whose contents are stored in the Cache Memory 94 is to be refreshed, the line in the Cache Memory 94 is written to the row in the Bank 64 instead. This approach maintains coherency between the Bank 64 and the Cache Memory 94 if any writes to Cache Memory 94 have been performed. If the memory controller 44 is managing the Cache System 90, then a write to the Bank 64 in this manner is unnecessary as the memory controller 94 must instead issue a specific Precharge-Write to the DRAM device 60 to store a cache line in the Bank 64. This Precharge-Write is most easily done before an Activate command loads new contents to the Cache Memory 94. Other techniques may, of course, be used to postpone writing the old contents of a line before reading new contents. This reduces read latency at the cost of some additional circuitry in cache management.

Alternatively, the Cache System 90 can be entirely decoupled from the refresh of the Bank 64. In such case, the data stored in the Cache Memory 94 can store the data that was stored in the row of memory cells of the Bank 64 that are being refreshed. The contents of the Bank 64 will then be coherent with the data stored in the Cache Memory 64 and my be considered valid. In this case, the memory controller 44 should be designed so that it is responsible for ensuring that cache lines are written back to the Bank 64 before new lines are loaded. In alternative embodiments, the Cache System 90 can be designed to automatically perform this function, or the memory controller 44 can be designed to explicitly evict cache lines in the event the memory controller 44 is to fully control the Cache System 90.

In some embodiments, each line of the Cache Memory 94 be a fraction of a line in the Bank 64, such as half, quarter, or eighth of a line the Cache Memory line would be 512, 256, or 128 bytes, respectively, for Bank 94 lines of 1K bytes. This approach can decrease the needed size of the Cache Memory 94. In other embodiments, the size of each line in the Cache Memory 94 can be configurable through a mode register (not shown), which is typically used in memory devices.

In some embodiments, the memory bus 46 (FIG. 1) includes a cache control line that allows the memory controller 44 to provide a signal to the Cache System 90 indicating whether or not a memory command is to reference the Cache System 90. A command sent without being indicated as an access to the Cache Memory 94 is then considered a "normal" reference made to a row/page of the Bank 46.

In other embodiments, the memory bus 46 (FIG. 1) includes a status line that allows the system memory 40 to provide to the memory controller 44 a signal indicating whether or not an access to the Cache Memory 94 indicating whether the access resulted in a cache hit. If, on a cache read operation, the data was found in the Cache Memory 94, data is returned with the hit signal. If data is not found in the Cache Memory 94, no data is returned, and the status signal indicates a cache miss. In such case, the memory controller 44 must send the command again after waiting for a row from the Bank 64 to be loaded into the Cache Memory 94. If the command was for a write and the write was successfully written in the memory controller 44, a cache hit status signal is returned to the memory controller 44. If, instead, a cache miss status signal is returned, a line is evicted from the Cache Memory 94 to create space, a read reference is made for the evicted line, and a write is made back to the row of the Cache Memory 94, merging written data in the evicted line with data from the Bank 64. In some designs, output status line may be included to indicate a cache write hit or miss separately from read cache hit or miss. In such case, when read data is returned, a Read Hit signal is output from the DRAM 60. If an immediately previous write missed, that miss signal is required for the memory controller 44 to control its state and timing, such as that the an eviction sequence is occurring in the memory device 60. A 'hit' signal is returned if a normal/non-cache reference is made and the requested address matches a cached line.

If a cache reference is made that causes a miss sequence, the DRAM 60 processes the miss so that all non-cache references cause an automatic precharge in the Bank 64. When a cache reference is made for data that is, in fact, not in the Cache Memory 94, a cache line is chosen and assigned to hold data for all references to that line, which is know as "allocation." If the original reference is a read, data is loaded from the Bank 64, and all data in the allocated line is set valid. If a write operation is the original reference, then only the written portion of the line is valid. If a cache read reference hits, the Cache System 90 returns the referenced data with a hit signal. If a write reference hits, the write data is written into a line of the Cache Memory 94, marking that data as changed. The Cache System 90 then returns a hit signal. If a write reference misses, a line to be evicted is found. The evicted line is moved to another storage device, such as the Bank 64 or a line buffer (not shown), the new write data are written into the evicted line in the Cache Memory 94, and that data are marked as "changed." These "changed" signals are used when evicted lines are written back to the Bank 64, so that correct data can be stored/restored back to the bank 64. As data are accepted into the freed-up line, a bank cycle is started to store any write data written to the evicted line while it was in the Cache Memory. This is done by reading the needed row from the Bank 64 using the tag address for the evicted line, merging write data from the evicted line with the read data from the Bank 64, and writing the result back to the Bank 64. A miss signal is then returned to the memory controller 44. If a subsequent read reference arrives for a line in which miss processing is already underway, a miss is returned. Finally, any miss reference allocates an unallocated/invalid sub-cache line if one is properly available.

In general, it is preferable for an operation that consists of two or more parts to be performed as a single indivisible operation. An example is where a byte in a 32-bit word is updated (read and then written) while preventing access to the word while the update is being executed. Functions like these, which are sometime referred to as "atomic," are desired when parallel processes access and update shared data.

Portions of a cache line containing portions holding data that must be written back to the Bank 64 when the line is invalidated must to marked to indicate that fact. Data in a cache line that must be written back to Bank 64 is most often referred to as "dirty." However, when data from a write command is written to a portion of a cache line, the cache line is considered "changed." On the other hand, if an evicted line has no changes—data in the line was only read—the contents of the Bank 64 can be considered valid and a bank cycle can be avoided. However, the design of the memory controller 44 can be simplified if a line eviction evicted lines always cause a memory cycle; otherwise the memory controller 44 has to track each line's changed state. As a result, the Bank 64 should always store evicted lines without regard to whether that line is changed and/or been written to while in the Cache Memory 94. If the contents of a line in the Cache Memory 94 are in a state or are processed so that the line does not hold valid data or data that is different than the current contents of the Bank 64, the line can be reallocated with new contents. If portions of a line are marked changed as explained above, then invalidation involves writing those portions back to the Bank 64 and then setting a line's Invalid flag. If nothing in a cache line has been written/changed, then the invalid flag is simply set. At startup all lines are marked invalid.

Rather than have a line from the Bank 64 be able to be placed at any location in the Cache Memory 94 (which can take a lot of logic to support), some of the row bits of the requested address can be used to restrict which cache addresses can hold the line. If a particular line can be placed in only two places in the Cache Memory 94 so that only two memory tags must be examined, this is known as a 2-way set associative implementation. If a line can go in only four places, this is known as a 4-way set associative implementation. As the level of associativity is increased, the memory performance is increased as well as the logic expense to support the improvement. However, 1-way a set associative implementation should be avoided because it does not provide good performance because of almost constant cache evictions, which can slow the operation of the Cache System 90 to limits governed by the memory cycle time.

In the even the system memory 40 includes multiple banks of memory cells, a portion of the Cache Memory 64, which can be considered a sub-cache, may be associated with each memory bank. This allows full overlap of operations between banks as well as operations involving cache references. Each piece of the Cache Memory 64 is as independent of the others as each bank is independent of the other banks. For each memory bank there can also be cache references ongoing with memory references as long as all the cache references 'hit' or memory operations interleave cache operations.

References sent by the memory controller 44 without the cache status signal active are considered "normal" references to a row of the Bank 64. It is normally an error to make a row-buffer, non-cache memory reference to data that is stored in the Cache Memory 94. If this is done the memory returns a hit status signal, indicating the situation. In some embodiments, all references are considered to the Cache Memory 64. If the cache status signal is not active for a request and the data is not in the Cache Memory 64, a normal page/row buffer reference is made without data being placed into the Cache Memory. If the referenced data is, in fact, stored in the Cache Memory 94, that data is returned instead of what is stored in the Bank 64.

In the embodiment shown in FIG. 2, refresh commands normally do not affect the Cache System 90 in any way. Correct memory state is kept by writing evicted cache lines back to the Bank 64, generally as new references are allocated in the Cache Memory 94. The memory controller 44 can also evict specific lines if desired. Lines can explicitly be evicted by the memory controller 44 by indicating precharge for an address in a line to be evicted. Doing this is a primary part of enabling the memory controller 4 to have full knowledge of the cache state and to use the Cache System 90 as a variable-address buffer. Of course, the simplest thing for the memory controller 44 to send references to the Cache System 90 to get needed data to the Cache Memory 94 so that no references to the Cache Memory 94 will miss.

When making a cache reference so the cache status signal is active, a precharge request evicts the referenced cache line back to the Bank 64 at completion of the reference if the reference is a hit. Any data in the page/row of the Bank 64 is invalidated; the row buffer must not be awaiting a precharge signal or command to keep memory valid. This means that the row-buffer/normal/non-cache references are normally expected to be used in a close-page mode. If a read or write cache reference w/precharge misses, then the reference acts as if it is non-cached except that if a line would be evicted without the precharge then that still takes place and the evicted line is written back to the Bank 64 and the associated cache line marked invalid. Eviction will not be accomplished only if the line that would have been allocated is already invalid. Making a cache read reference w/precharge is an easy way for the memory controller 44 to evict (store to the Bank 64) a specific line or to create space in the Cache Memory 94 for a line that will be loaded in the future.

The memory controller 44 can also send specific cache activate commands to cause a row to be loaded into the Cache Memory. In such case, the memory controller 44 can normally only send read or write references, and the Cache System 90 will respond with either a hit or miss from each reference. Doing this supports a processor's 'Prefetch' function if extant.

If eviction is controlled by the memory controller 44 rather than the Cache System 90, the controller can have full knowledge of what memory lines are active in the Cache Memory 94. This is because evicting a line leaves that position in the Cache Memory 94 invalid/unallocated. Another line can then be loaded into the Cache Memory 94 without causing further misses, given that the new line can be allocated to the unallocated line's position. The memory controller 44 can also make miss references ahead of the time when data will actually be needed. This means that the memory controller 44 can know exactly what the cache hits and misses will be. This allows the memory controller 44 to use the Cache System 90 as a data buffer and not as a normal cache. With an added cache status signal as explained above, the memory controller 44 still has full memory access while being able to use the cache/buffer.

The use of the Cache System 90 in the DRAM 60 can easily support burst-of-4 ("b-o-4") operation. This is because the row bits of a memory address are used as Tag entries to see if the data requested is currently in the Cache Memory 94 and to reference them from the Bank 64 if needed. It thus takes two memory clocks to send references to the DRAM 90, even if the memory controller 44 operated as if the referenced data is stored in the Cache Memory 94. Cache references thus pair RAS and CAS requests. A cache/RAS reference does a tag translation so that a subsequent cache/CAS reference can be done. If the cache/RAS reference hits then no memory reference is made. If the cache/RAS reference misses, then an eviction sequence is started, if needed, and a read reference is made if the cache/CAS reference is a read.

The column bits of a cache reference are used to select the needed data from a cache line. If the memory bus 46 and the interface between the memory controller 44 and the DRAM 90 allow a subset of the row bits to be sent at the same time as the column bits, or if commands are sent DDR, like data bits, then b-o-2 could reasonably be supported. Because of the cache, the 10 pins are decoupled from bank cycle timing. However, additional signal lines could be included to indicate that there is no miss testing needed for this reference, and the other additional signals could reference the cache entry. If there are 16 cache lines in each bank then a total of 5 additional signals would be required. Alternatively, a cache state such as allocated/invalid could be made available through an extension of configuration/mode registers (not shown) that are typically included in memory devices. When making cache references, the RAS and CAS lines can be used to indicate specific cache commands. For example, to make an Activate reference w/o moving any data.

Figure 3:
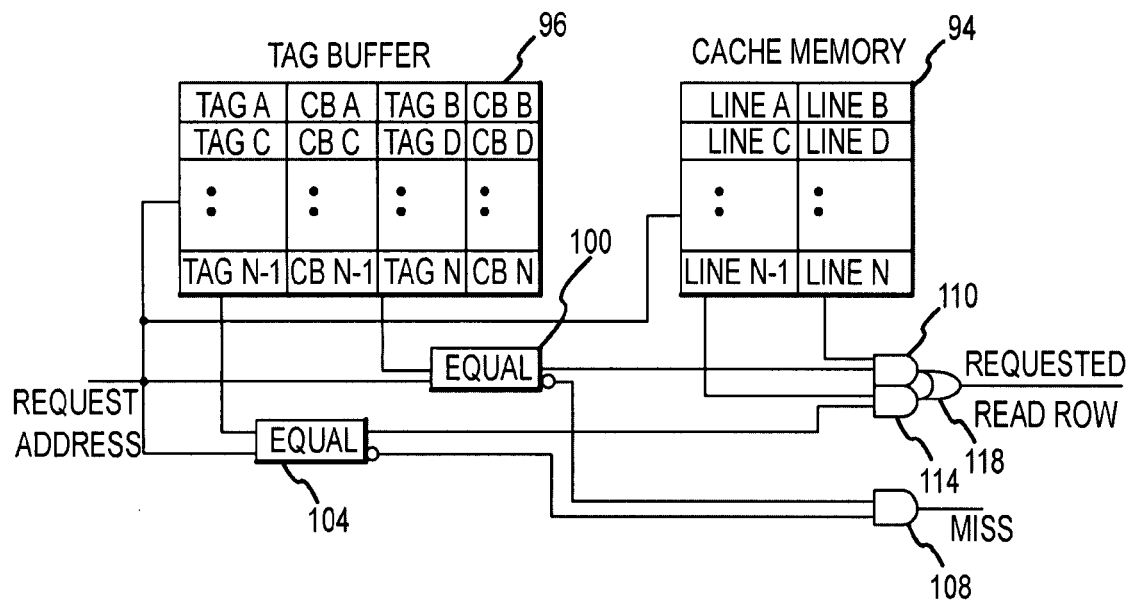
FIG. 3 is a block diagram of a portion of one embodiment of a parallel processing enhancement system in which a cache system is used to enhance parallel processor operations in the memory device of FIG. 2.

One embodiment of a 2-way set-associative implementation is shown in FIG. 3, although many other implementations are possible depending on the desired level of set-associativity, amount of parallelism, options on how lines are evicted, etc. With reference to FIG. 3, a plurality of tags Tag A—Tag N are shown as being stored in the Tag Buffer 96. When writing, two tags are read (the same as when reading) from each line and compared by respective Equal Comparators 100, 104 to a portion of the request address. Each of the Equal Comparators 100, 104 has two outputs, a true output, which is "1" if the respective tags match the bits of the request address, and a false output, which is "1" if the respective tags do not match the bits of the request address. The false outputs are applied to respective inputs of an AND gate 108. The AND gate 108 outputs a "Miss" signal if either of the Equal Comparators 100, 104 output a false signal indicative of the lack of a match.

It should never occur that both of the selected tags match as this means that a line is in the cache twice. Not all bits of a requested address are used in the equality testing. Some of the bits are used to choose one of the set-associated groups and are not stored in the Tag buffer either. The true outputs of the Equal Comparators 100, 104 are applied to respective AND gates 110, 114, which also receive respective bits from the cache. In the event of a match, an enabling signal to read a requested row is generated by an OR gate 118, which receives respective outputs from the AND gates 110, 114. The signal output by the OR 118 indicates the data stored designated by the requested address is present in a corresponding row of the Cache Memory 94.

The "CB's" in the Tag Buffer 96 stands for Change Bits. When write operations are sent to the Cache System 90, bits are set in the corresponding tag entry to record the column addresses written in that line. These bits are then used when a cache line is evicted and the data replaced in the Bank 64. There are some other bits, generally kept in the Tag Buffer 96, that are not shown here. These support LRU (Least Recently Used, for assisting in line evictions) operation for example, or might include a bit that, if set, prevents a line in the cache from being written/changed.

Figure 4:
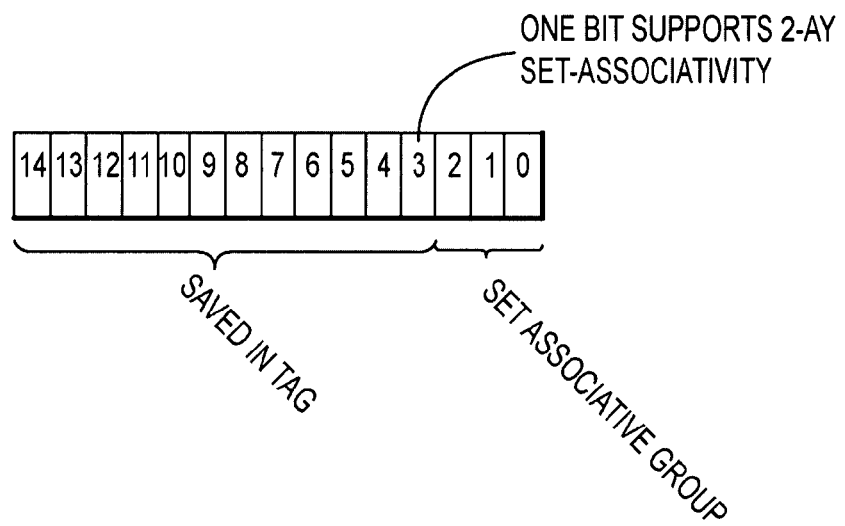
FIG. 4 is a schematic diagram showing one embodiment of a tag address that may be stored in a tag buffer in the cache system of FIG. 3.

With reference to FIG. 4, the request address in the Figure is the row bits of the total address minus the bottom bit (for the 2-way SA implementation being shown here). This means that if the requested data is in the Cache Memory 94 that it could be in two places in the cache, locations C and D for example. As the requested address is sent to the Tag Buffer 96 and to the Cache Memory 94, bits are dropped from the top of the row address until the number of bits left address the number of lines in the Tag Buffer 96 and the Cache Memory 94. Two tags are read out and compared with the corresponding bits of the requesting address. If one of the addresses read out matches the requesting address the corresponding cache line contains the requested data, and the OR gate 118 outputs a logic "1". For example, assume there are 16 line entries in the Cache Memory 94 with 16 entries in the Tag Buffer 96.

Memory Line 0 can only go into cache positions A or B. This is also true for ML 1, ML 16, ML 17, ML 32, etc. Memory line 2 can only go into cache positions C or D. In some embodiments, the set associativity of the implementation where things can go as well as the organization of the Cache System 90 are charged, which changes the number of equality comparators 100, 104 required. The row address bits that are not used in addressing the Tag Buffer 96 and Cache Memory 94 are exactly the bits that are stored in each tag entry that are then compared with each requesting address in the equality testing.

When a line is to be evicted from the Cache Memory 94 so that another line can take its place, the request address of the new line, indicates the choices in the line to be evicted. Generally the line that has the fewest or oldest references is picked for eviction. In other embodiments, simpler eviction procedures are used, such as picking the line to be evicted at random. In the embodiment shown in the figures, a function can be sent to evict a particular line as a command from the memory controller 44. This may provide higher performance at relatively little or no cost.

In another embodiment, if Change Bits ("CBs") are supported down to the lowest level (4-bit nibble), then a large number of CBs are provided for each line of the Cache Memory 94. In still another embodiment, a read reference is made to the Bank 64 when a write miss happens, and the Cache System 90 merges data into the allocated cache line. This means that the whole line can then be written back to the Bank 64 when the line is evicted. However, the write data of the original miss reference and any subsequent references must be held until read data from the Bank 64 are returned to validate the line in the Cache Memory 94, or change bits (or a simplified equivalent) must be used to enable a correct data merge to be performed. As mentioned above, in the event of a cache miss, all row address bits are used to reference the Bank 64.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An integrated circuit memory device, comprising:
   at least one bank of memory cells;
   an addressing circuit coupled between external terminals and the at least one bank of memory cells;
   a data path coupled between external terminals and the at least one bank of memory cells;
   a command decoder coupled to external terminals, the command decoder being operable to generate control signals to control an operation of the memory device; and
   a cache system integrated with the at least one bank of memory cells, addressing circuit data path and command decoder and coupled to the at least one bank of memory cells, the cache system being configured to cache data stored in the at the least one bank of memory cells regardless of where cached data are stored in the at least one bank of memory cells, the integrated circuit memory device being configured to allow data to be transparently accessed through the command decoder, addressing circuit, and data path regardless of whether the data are stored in the at least one bank of memory cells or the cache system.

2. The memory device of claim 1 wherein the cache system comprises:

a tag buffer operable to receive a first portion of a received address and to use the first portion of the received address to access tag addresses;

a tag comparator coupled to the tag buffer, the tag comparator being operable to compare the tag addresses from the tag buffer to a second portion of a received address; and a cache memory coupled to the tag buffer, the cache memory being operable to store data, the data stored in the cache memory being accessed by the tag addresses from the tag buffer.

3. The memory device of claim 1 wherein the memory device comprises a plurality of banks of memory cells, and the cache system comprises a respective portion of the cache memory for each of the plurality of banks of memory cells, the portions of the cache memory being operable to cache data stored in respective ones of the plurality of banks of memory cells.

4. The memory device of claim 1 wherein the at least one bank of memory cells comprise at least one bank of dynamic random access memory cells.

5. The memory device of claim 1 wherein the cache system is operable to read data or provide write data simultaneously with operations being performed in the at least one bank of memory cells.

6. The memory device of claim 5 wherein the cache system is operable to read data or provide write data simultaneously with the memory cells in the at least one bank of memory cells being self-refreshed or in a low-power mode.

7. A computer system, comprising:

a plurality of processors operating in parallel to perform parallel processing functions;

a system controller coupled to the processors, the system controller including a memory controller; and an integrated circuit system memory device coupled to the memory controller and being accessible by all of the plurality of processors, the system memory device comprising:

at least one bank of memory cells;

an addressing circuit coupled to the memory controller, the addressing circuit being operable to address the least one bank of memory cells responsive to address signals received from the memory controller;

a data path coupled to the memory controller, the data path being operable to couple write data from the memory controller and to couple read data from the at least one bank of memory cells to the memory controller;

a command decoder coupled to the memory controller, the command decoder being operable to generate control signals to control an operation of the memory device responsive to memory command signals received from the memory controller; and a cache system integrated with the at least one bank of memory cells, addressing circuit, data path and command decoder and coupled to the at least one bank of memory cells, the cache system being configured to cache data stored in the at the least one bank of memory cells regardless of where cached data are stored in the at least one bank of memory cells and being configured to allow all of the plurality of processors to transparently access the at least one bank of memory cells and the cache system.

8. The computer system of claim 7 wherein the cache system comprises:

a tag buffer operable to receive a first portion of an address received from the memory controller and to use the first portion of the received address to access tag addresses;

a tag comparator coupled to the tag buffer, the tag comparator being operable to compare the tag addresses from the tag buffer to a second portion of a received address; and a cache memory coupled to the tag buffer, the cache memory being operable to store data, the data stored in the cache memory being accessed by the tag addresses from the tag buffer.

9. The computer system of claim 7 wherein the memory device comprises a plurality of banks of memory cells, and wherein the cache system comprises a respective portion of the cache memory for each of the plurality of banks of memory cells, the portions of the cache memory being operable to cache data stored in respective ones of the plurality of banks of memory cells.

10. The computer system of claim 7 wherein the at least one bank of memory cells comprise at least one bank of dynamic random access memory cells.

11. The computer system of claim 10 wherein the cache memory is operable to cause the at least one bank of memory cells to be precharged when data are being written to the cache memory.

12. The computer system of claim 7 wherein the memory controller is operable to maintain a record of the data stored in the cache memory, the memory controller further being operable to direct read requests to the at least one bank of memory cells in the event the record indicates that read data to be fetched are not stored in the cache memory and being operable to direct read requests to the cache memory in the event the record indicates that read data to be fetched are stored in the cache memory.

13. The computer system of claim 7 wherein the memory controller is operable to maintain a record of the data stored in the cache memory and is operable to use the record to avoid cache misses and to use the cache system as a variable-address memory buffer.

14. The computer system of claim 7 wherein the system memory device further comprises refresh logic operable to write data stored in the cache memory to a row of memory cells in the at least one bank after the row of memory cells has been precharged.

15. The computer system of claim 7 wherein the memory controller is further operable to provide a signal to the cache system indicating whether a memory command provided to the system memory device by the memory controller is directed to the cache memory.

16. The computer system of claim 7 wherein the cache system is operable to provide to the memory controller a signal indicating whether or not an access to the cache memory resulted in a cache hit.

17. The computer system of claim 7 wherein the cache system is operable to read data or provide write data simultaneously with operations being performed in the at least one bank of memory cells.

18. The computer system of claim 17 wherein the cache system is operable to read data or provide write data simultaneously with the memory cells in the at least one bank of memory cells being self-refreshed or in a low-power mode.

19. In an integrated circuit memory device, a method of enhancing the ability of the memory device to interface with a plurality of parallel processors, the method comprising:

caching data in a cache within the integrated circuit memory device by separately storing in the cache a subset of the data that is stored in at least one bank of memory cells in the integrated circuit memory device regardless of where the subset of data is stored in the at least one bank of memory cells; and allowing each of the plurality of processors to transparently access the subset of data stored in the integrated circuit memory device from the cache and to access data stored in the integrated circuit memory device other than the subset of data from the at least one bank of memory cells.

20. The method of claim 19 wherein the integrated circuit comprises a plurality of banks of memory cells, and wherein the method comprises separately caching respective subsets of data stored in each of the plurality of banks.

21. The method of claim 19 wherein the memory device comprises a dynamic random access memory ("DRAM") device, and wherein the method further comprises precharging the DRAM memory cells based on the caching of data within the integrated circuit memory device.

22. The method of claim 19, further comprising:
maintaining a record externally of the memory device of the data stored in the cache;
if the record indicates that read data to be fetched are not stored in the cache, coupling memory requests to the integrated circuit memory device that are directed to the at least one bank of memory cells; and
if the record indicates that read data to be fetched are stored in the cache, coupling memory requests to integrated circuit memory device that are directed to the cache.

23. The method of claim 19, further comprising:
maintain a record externally of the memory device of the data stored in the cache; and
using the record to avoid cache misses.

24. The method of claim 19, further comprising:
maintain a record externally of the memory device of the data stored in the cache; and
using the record to operate the cache system as a variable-address memory buffer.

25. The method of claim 19, further comprising providing a signal to the integrated circuit memory device indicating whether a memory command provided to the integrated circuit memory device is directed to the cache.

26. The method of claim 19 wherein the act of caching data within the integrated circuit memory device comprises caching data within the integrated circuit memory device simultaneously with operations being performed in the at least one bank of memory cells.

27. The method of claim 26 wherein the act of caching data within the integrated circuit memory device comprises caching data within the integrated circuit memory device simultaneously with the memory cells in the at least one bank of memory cells being self-refreshed or in a low-power mode.

* * * * *

UNITED STATES PATENT AND TRADEMARK OFFICE
CERTIFICATE OF CORRECTION

| | | |
|---|---|---|
| PATENT NO. | : 7,822,911 B2 | Page 1 of 1 |
| APPLICATION NO. | : 11/893604 | |
| DATED | : October 26, 2010 | |
| INVENTOR(S) | : David Resnick | |

It is certified that error appears in the above-identified patent and that said Letters Patent is hereby corrected as shown below:

In column 10, line 58, in Claim 1, delete "at the least" and insert -- at least --, therefor.

In column 11, line 60, in Claim 7, delete "at the least" and insert -- at least --, therefor.

Signed and Sealed this
Twenty-eighth Day of December, 2010

David J. Kappos
*Director of the United States Patent and Trademark Office*